(12) United States Patent
Yim et al.

(10) Patent No.: US 11,108,905 B2
(45) Date of Patent: Aug. 31, 2021

(54) METHOD OF PROCESSING INPUT INFORMATION WHILE PERFORMING COMMUNICATION USING MOBILE COMMUNICATION TERMINAL

(71) Applicant: Samsung Electronics Co., Ltd., Suwon-si (KR)

(72) Inventors: Seung Won Yim, Seoul (KR); Ja Mi Rhee, Seongnam-si (KR); Su Jung Youn, Euijeongbu-si (KR); Kyoung Taek Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/700,025

(22) Filed: Dec. 2, 2019

(65) Prior Publication Data

US 2020/0106875 A1 Apr. 2, 2020

Related U.S. Application Data

(63) Continuation of application No. 15/868,643, filed on Jan. 11, 2018, now Pat. No. 10,498,875, which is a continuation of application No. 13/658,175, filed on Oct. 23, 2012, now abandoned, which is a
(Continued)

(30) Foreign Application Priority Data

Dec. 2, 2006 (KR) .................. 10-2006-0121100

(51) Int. Cl.
*H04M 1/72403* (2021.01)

(52) U.S. Cl.
CPC .... *H04M 1/72403* (2021.01); *H04M 2250/70* (2013.01)

(58) Field of Classification Search
CPC ................. H04M 1/72522; H04M 2250/70
See application file for complete search history.

(56) References Cited

U.S. PATENT DOCUMENTS 6,289,226 B1 * 9/2001 Lekven ............ H04M 1/27485
455/566
6,463,304 B2 10/2002 Smethers
6,668,177 B2 12/2003 Salmimaa et al.
(Continued)

FOREIGN PATENT DOCUMENTS

KR 10-2004-0040541 A 5/2004
KR 10-2004-0070968 A 8/2004
(Continued)

*Primary Examiner* — Sahlu Okebato
(74) *Attorney, Agent, or Firm* — Jefferson IP Law, LLP

(57) ABSTRACT

A method of processing information inputted while a mobile communication terminal is in an active communications state is provided. The method of processing information inputted while a mobile communication terminal is in an active communications state includes receiving information inputted while the mobile communication terminal is in an active communications state; displaying, if the active communications state is terminated before processing the inputted information, the unprocessed inputted information that exists; and processing the unprocessed inputted information. The inputted information can be input using various input modes such as a numeral, Korean character, English character, and special character input modes.

15 Claims, 7 Drawing Sheets

Related U.S. Application Data continuation of application No. 11/940,069, filed on Nov. 14, 2007, now Pat. No. 8,311,586.

(56) References Cited

U.S. PATENT DOCUMENTS

| | | |
|---|---|---|
| 6,907,276 B2 | 6/2005 | Toba |
| 7,123,945 B2 | 10/2006 | Kokubo |
| 7,509,148 B1 | 3/2009 | Pisutha-Arnond et al. |
| 7,881,754 B2 | 2/2011 | Honda et al. |
| 7,925,305 B2 | 4/2011 | Honda |
| 8,000,750 B2 | 8/2011 | Honda et al. |
| 2002/0114438 A1 | 8/2002 | Ganugapati |
| 2004/0097264 A1 | 5/2004 | Bodnar et al. |
| 2006/0058063 A1 | 3/2006 | Bocking et al. |
| 2006/0246957 A1* | 11/2006 | Lim ............. H04M 1/72552 455/566 |
| 2006/0262097 A1 | 11/2006 | Moon |
| 2007/0232286 A1 | 10/2007 | Kim et al. |
| 2007/0282595 A1 | 12/2007 | Tunning et al. |

FOREIGN PATENT DOCUMENTS

| | | |
|---|---|---|
| KR | 10-2005-0055798 A | 6/2005 |
| KR | 10-2005-0058820 A | 6/2005 |
| KR | 10-2006-0062054 A | 6/2006 |

\* cited by examiner

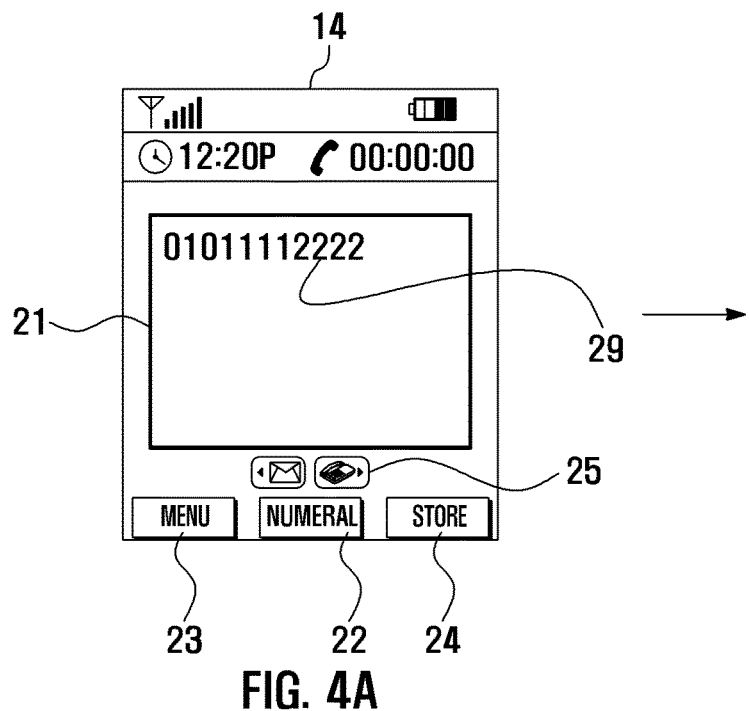
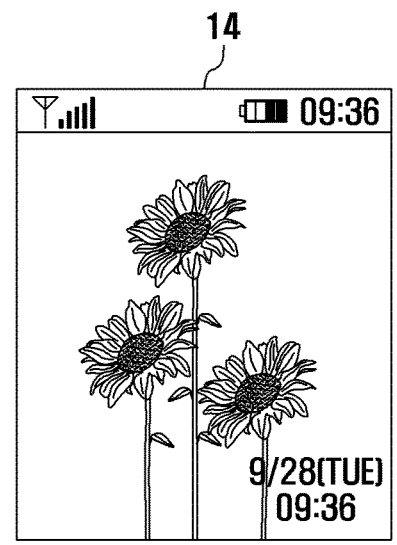
FIG. 4A    FIG. 4B
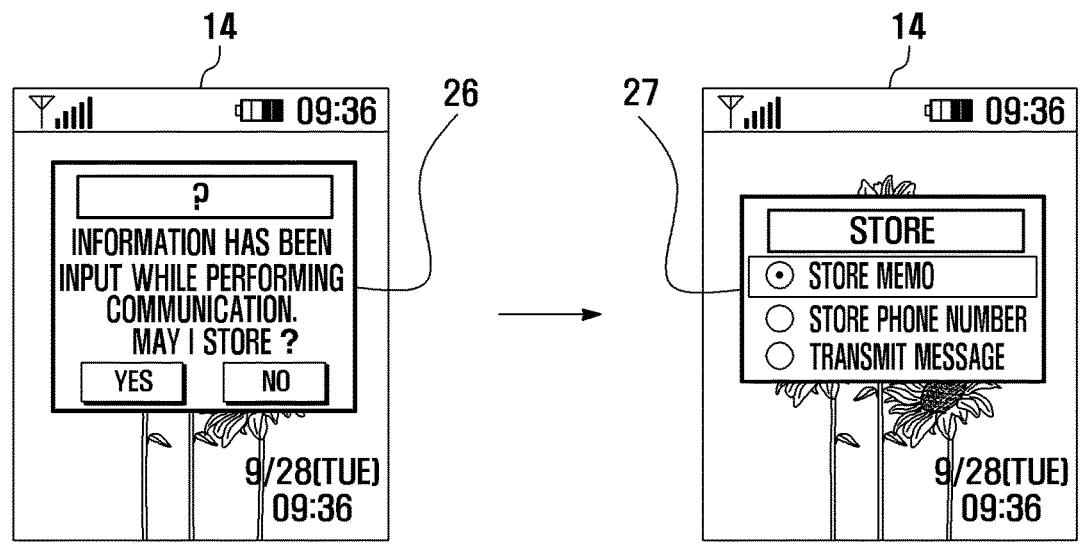
FIG. 4C    FIG. 4D

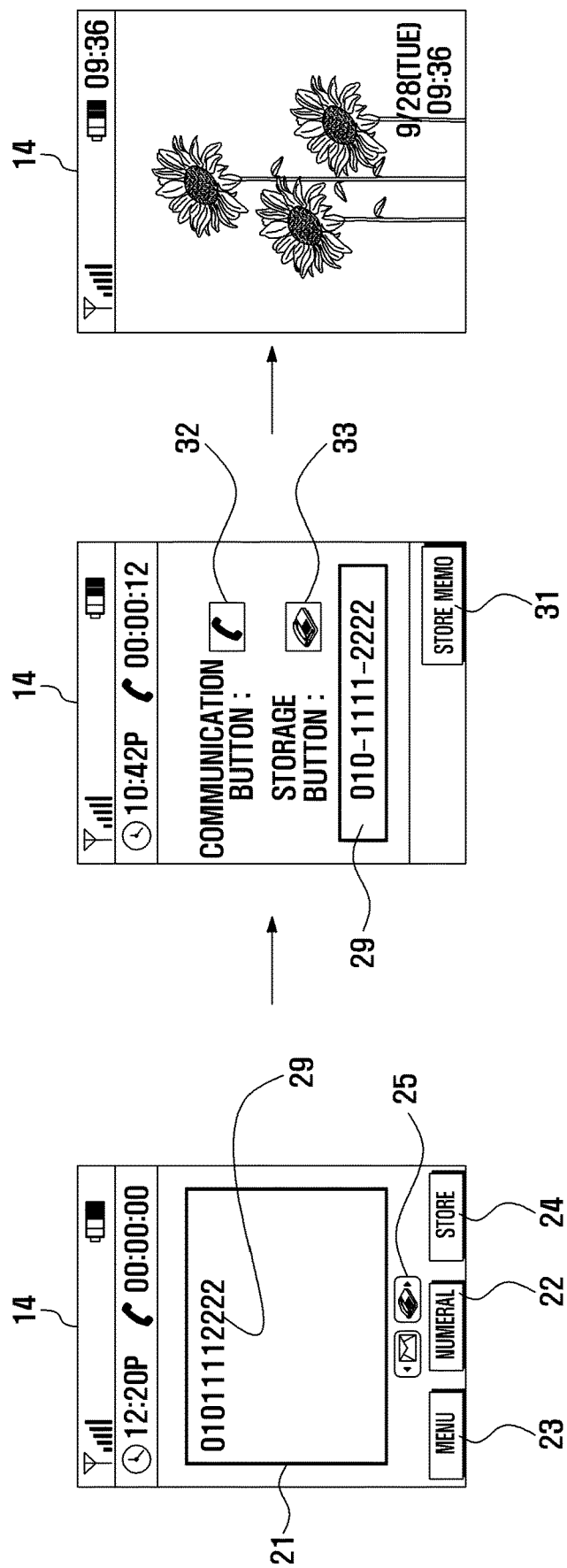

METHOD OF PROCESSING INPUT INFORMATION WHILE PERFORMING COMMUNICATION USING MOBILE COMMUNICATION TERMINAL

PRIORITY

This application is a continuation of U.S. patent application Ser. No. 15/868,643 filed on Jan. 11, 2018, which issued as U.S. Pat. No. 10,498,875 on Dec. 3, 2019; which is a continuation of U.S. patent application Ser. No. 13/658,175 filed on Oct. 23, 2012, which was abandoned; which is a continuation of U.S. patent application Ser. No. 11/940,069 filed on Nov. 14, 2007, which issued as U.S. Pat. No. 8,311,586 on Nov. 13, 2012; which claims the benefit under 35 U.S.C. § 119(a) of a Korean patent application filed in the Korean Intellectual Property Office on Dec. 2, 2006 and assigned Serial No. 10-2006-0121100, the entire disclosure of each of which is hereby incorporated by reference.

BACKGROUND OF THE INVENTION

1. Field of the Invention

The present invention relates to a method of processing information of a mobile communication terminal. More particularly, present invention relates to a method of processing information inputted while a mobile communication terminal is in an active communications state.

2. Description of the Related Art

Due to the evolution of mobile communication technologies, voice communication can be performed almost everywhere using a mobile communication terminal. Various functions have been added to mobile communication terminals, such as functions for character information, image information, MP3, and games. Users can interact with the various functions through a screen of the mobile communication terminal.

One particular function enables a user to search for a phone number through key input or input numeral information such as a phone number using a numeric key, while the mobile communication terminal is in an active communications state. Herein, the user can store the inputted numeral information in a storage unit of the mobile communication terminal.

However, because a conventional mobile communication terminal can input only numerals through key input while performing a communication, information that can be input while performing a communication is limited. For example, even simple content including a word or a sentence cannot be input while performing a communication.

If the active communication state is compulsorily terminated by closing a slider or a folder before storing the inputted numeral information, the communication is terminated without using a communication termination screen, and thus the inputted numeral information is lost.

Alternatively, if a communication termination screen is entered before storing the inputted numeral information, during a time period in which the communication termination screen remains displayed, the inputted numeral information may be stored. However, the duration of the time period in which the communication termination screen remains displayed may be as short as a few seconds, and if a user is unfamiliar with a method of inputting a key for storing the inputted numeral information, it may be difficult to store the inputted numeral information during the short time period in which the communication termination screen remains displayed. Therefore, in this case, there is a high probability of losing the inputted numeral information.

SUMMARY OF THE INVENTION

An aspect of the present invention is to address at least the above-mentioned problems and/or disadvantages and to provide at least the advantages described below. Accordingly, an aspect of the present invention is to provide a method of processing information inputted while a mobile communication terminal is in an active communications state using a mobile communication terminal that enables the input of information using various input modes such as a numeral, Korean character, English character, and special character input modes.

In accordance with an aspect of the present invention, a method of processing information inputted while a mobile communication terminal is in an active communications state is provided. The method includes receiving information inputted while the mobile communication terminal is in an active communications state, displaying the inputted information and at least one selectable processing function to process the inputted information, selecting a processing function of the at least one selectable processing function to process the inputted information, and parsing and processing the inputted information according to the selected processing function.

In accordance with another aspect of the present invention, a device for processing information inputted while a mobile communication terminal is in an active communication state is provided. The device includes a controller for parsing and processing information inputted while the mobile communication terminal is in an active communication state, a storage unit for storing the inputted information, a program for processing the inputted information, and data generated while executing the program, and a display unit for displaying function menus executed in the mobile communication terminal and data stored in the storage unit, wherein the active communications state is a state in which the mobile communication terminal is engaged in communications with another mobile communication terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 4A through 4D illustrate an example of a screen according to a process of processing inputted information, for example, the process of FIG. 3 according to an exemplary embodiment of the present invention;

FIGS. 6A through 6C illustrate an example of a screen according to a process of processing inputted information, for example, the process of FIG. 5 according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 7B, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
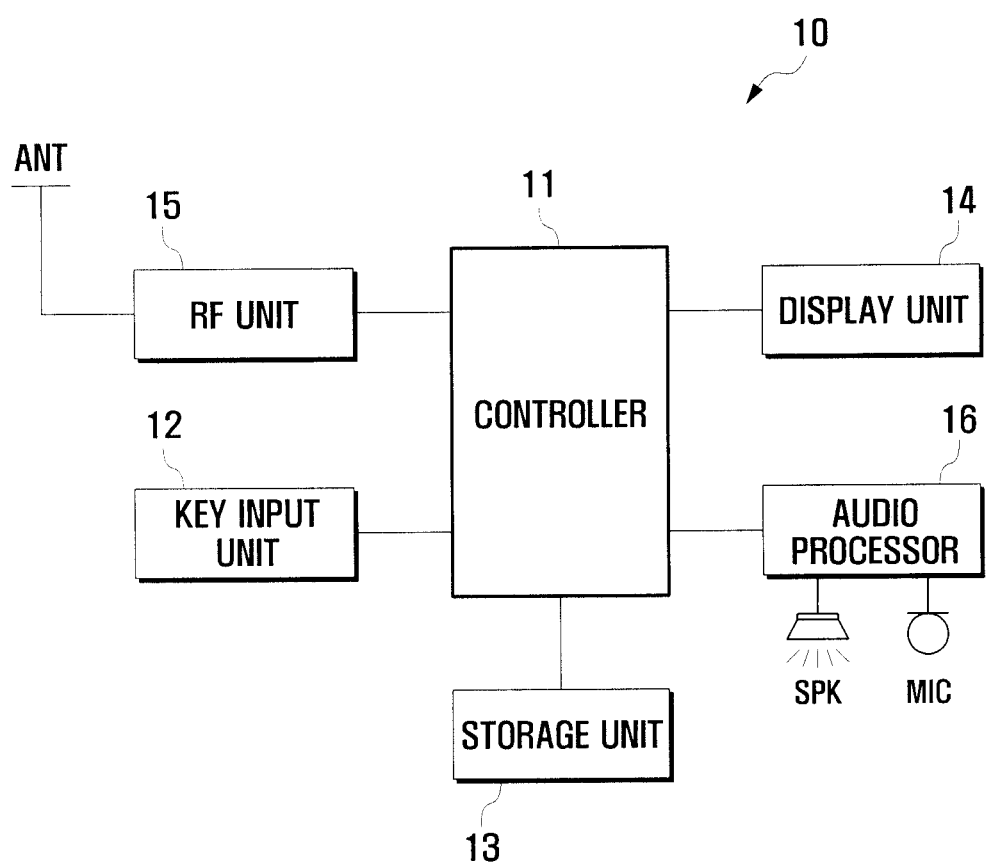
FIG. 1 is a block diagram illustrating a configuration of a mobile communication terminal for applying a method of processing information inputted while the mobile communication terminal is in an active communications state, according to an exemplary embodiment of the present invention.

FIG. 1 is a block diagram illustrating a configuration of a mobile communication terminal for applying a method for processing information inputted while in an active communications state, according to an exemplary embodiment of the present invention.

Referring to FIG. 1, a mobile communication terminal 10 includes a controller 11, key input unit 12, storage unit 13, display unit 14, Radio Frequency (RF) unit 15 and audio processor 16.

The controller 11 performs control operations for the mobile communication terminal 10. The controller 11 controls the processing of information inputted while the mobile communication terminal is in an active communications state.

The key input unit 12 comprises a plurality of keys used for entering at least one of information and user instructions into the mobile communication terminal 10. The key input unit 12 further generates key data according to one or more key selections of the user, and outputs the generated key data to the controller 11. The generated key data may represent a communication initiation instruction, information entered during an active communications state, a communication termination instruction and a processing function selected to be carried out using the inputted information. The key input unit 12 includes alphanumeric keys arranged in a format of 3×4, 5×4, or any other suitable format. The key input unit 12 further includes a navigation key, communication initiation key and communication termination key. Alternatively, key input unit 12 may be implemented using any other structure for data entry, such as a touch screen, handwriting recognition input device, or voice to text conversion device. Furthermore, key input unit 12 may be implemented as a structure that is separate from mobile communication terminal 10 and is wirelessly coupled to mobile communication terminal 10. Moreover, key input unit 12 may be implemented as a structure that is selectively detachable from mobile communication terminal 10.

The storage unit 13 stores a program required for controlling the operation of the mobile communication terminal 10 and data generated while executing the program. Further, the storage unit 13 stores a program for processing information inputted while mobile communication terminal 10 is in an active communications state, and data generated while executing the program. The storage unit 13 further stores information inputted while mobile communication terminal 10 is in an active communications state. The inputted information includes at least one of a numeral, Korean character, English character, and special character. Furthermore, storage unit 13 may be implemented as a structure that is separate from mobile communication terminal 10 and is wirelessly coupled to mobile communication terminal 10. Moreover, storage unit 13 may be implemented as a structure that is selectively detachable from mobile communication terminal 10.

The display unit 14 displays various function menus executed in the mobile communication terminal 10 and data stored in the storage unit 13 as an image on a screen. The display unit 14 displays an image required for processing the information that is inputted while the mobile communication terminal 10 is in an active communications state. For example, display unit 14 may display an input field required for inputting information and a selectable processing function required for processing the inputted information. The selectable processing function can be displayed as an icon mapped to a key of the key input unit 12. Furthermore, display unit 14 may be implemented as a structure that is separate from mobile communication terminal 10 and is wirelessly coupled to mobile communication terminal 10. Moreover, display unit 14 may be implemented as a structure that is selectively detachable from mobile communication terminal 10.

The RF unit 15 modulates a signal output from the controller 11, converts a frequency thereof, and transmits the modulated signal as a radio frequency signal through an antenna ANT. The RF unit 15 receives a signal through the antenna ANT, converts a frequency of the reception signal, demodulates the reception signal, and outputs the demodulated signal to the controller 11.

The audio processor 16 digitizes voice information under the control of the controller 11 that has been input through a microphone MIC, demodulates voice data that was received by the RF unit 15, and outputs the demodulated voice data through a speaker SPK. Furthermore, any number of the audio processor 16, SPK or MIC may be implemented as a structure that is separate from mobile communication terminal 10 and is wirelessly coupled to mobile communication terminal 10. Moreover, any number of the audio processor 16, SPK or MIC may be implemented as a structure that is selectively detachable from mobile communication terminal 10.

The controller 11 processes information inputted while mobile communication terminal 10 is in an active communications state. However, if the active communications state is terminated before inputted information has been processed, the controller 11 controls the display unit 14 to display a notification that there is unprocessed inputted information and processes the unprocessed inputted information. The controller 11 processes the unprocessed inputted information according to a process based on the mechanism used to terminate the active communications state. Exemplary mechanisms used to terminate the active communications state include termination by either a compulsory termination or a termination initiated via a communication termination screen.

The controller 11 processes the inputted information according to a selected processing function while the mobile communication terminal 10 is in an active communications state or after the active communications state has been terminated. When processing the inputted information, the controller 11 first divides the inputted information into a numeral string and a character string according to a parsing rule. An exemplary parsing rule is described in greater detail below. The controller 11 then processes the inputted information for use with an application program according to a processing function selected by the user. Exemplary application programs include a phone book, character message, and memo applications. Examples of processing of the inputted information for use with an application program according to a selected processing function are described below.

When the selected processing function is 'storage of a memo', the controller 11 stores all of the inputted information into a memo pad of a memo application without dividing the information into a numeral string and a character string. The inputted information stored in the memo pad can then be checked by a user through a call log.

When the selected processing function is 'storage of a phone number', the controller 11 sends a character string of the inputted information to a name input field of a phone book application and sends a numeral string of the inputted information to a phone number input field of the phone book application. In this case, if a plurality of character strings exist, the character strings are separated from one another by an empty space, arranged in one line, and sent to the name input field. If a size of the character string exceeds a maximum input value of the name input field, any excess characters are deleted. If the numeral string includes a plurality of phone numbers, the numeral string is divided by prefixes and then the divided numeral string is sent to a phone number input field.

When the selected processing field is 'transmission of a message', the controller 11 sends all inputted information to a message text field and sends the numeral string of the inputted information to a recipient input field. In this case, if the numeral string includes a plurality of phone numbers, the numeral string is divided and the divided parts are sent to a plurality of recipient input fields.

Parsing of the inputted information can be performed according to the following exemplary rule.

1. A numeral string arranged with only numerals, and a numeral string that includes one numeral in which a '*' or '#' is arranged adjacent to the numeral, is called a 'numeral string'.

2. If a numeral string has more than 3 digits, the numeral string is recognized as a valid phone number.

3. If ' ' (blank space) or '-' (hyphen) exists between numeral strings, numeral strings arranged adjacent to a ' ' (blank space) or '-' (hyphen) are recognized as associated numeral strings.

4. If a plurality of ' ' (blank space) or '-' (hyphen) is arranged between numeral strings, the plurality of ' ' (blank space) or '-' (hyphen) is recognized as a separator.

5. A character string that is not a numeral string (including '*' and '#') or ' ' (blank space) or '-' (hyphen) is recognized as a separator.

6. A numeral string is cut to a length within the longest numeral string length allowed by the mobile communication terminal.

7. Only a numeral string having 7 or more Arabic numeral digits among numeral strings satisfying a condition of articles 1 to 6 is finally displayed in a list. Although, when a hyperlink is used, a link is activated from 3 digits.

8. When articles 1 to 7 are applied, a string that is not recognized as a phone number is regarded as a character string.

Figure 2:
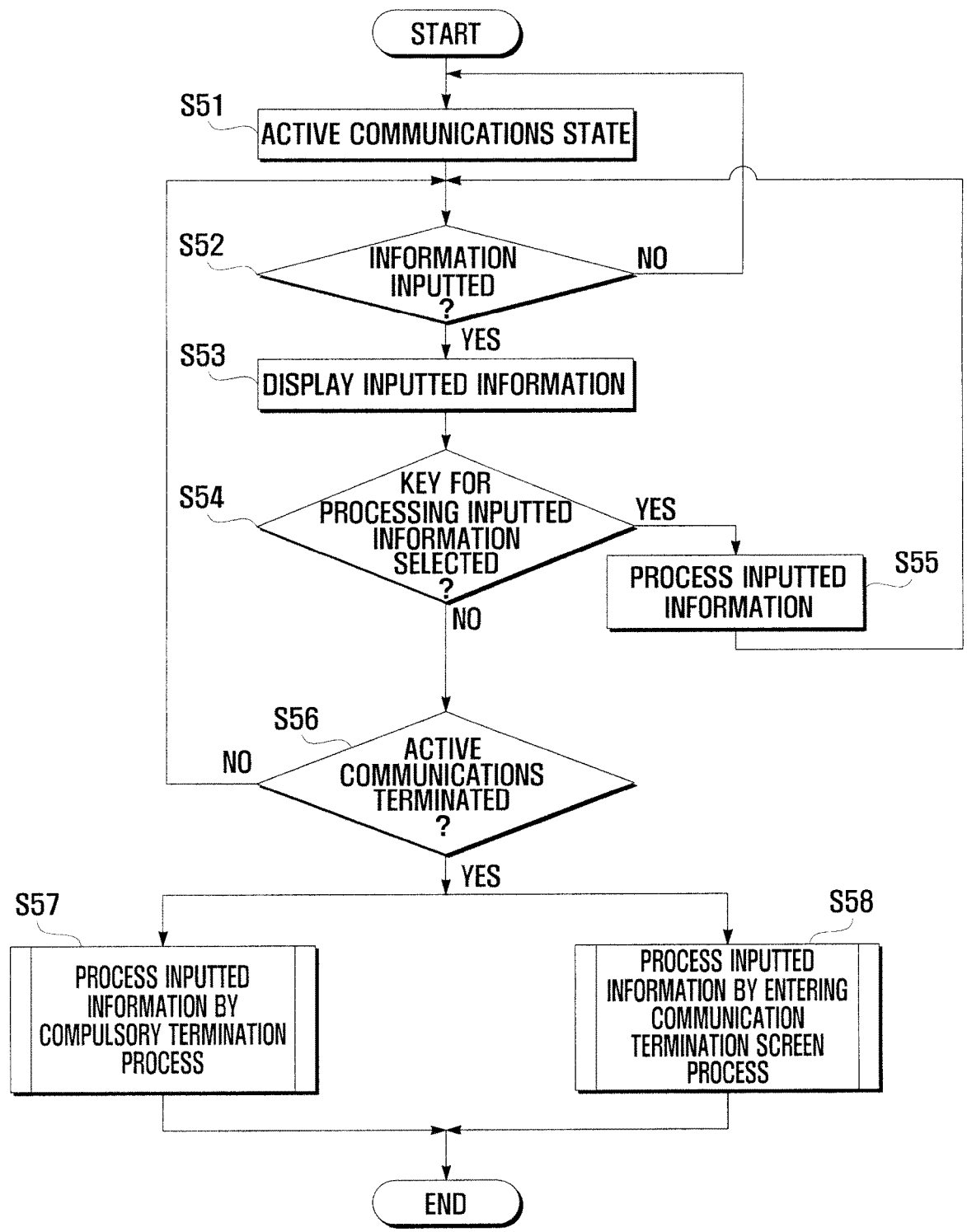
FIG. 2 is a flowchart illustrating a method of processing information inputted while the mobile communication terminal is in an active communications state, according to an exemplary embodiment of the present invention.

FIG. 2 is a flowchart illustrating a method of processing information inputted while a mobile communication terminal is in an active communications state, according to an exemplary embodiment of the present invention.

Referring to FIGS. 1 and 2, the method of processing information inputted while using a mobile communication terminal in an active communications state starts when the mobile communication terminal is in an active communications state in step S51. The controller 11 controls the mobile communication terminal 10 to enter an active communications state to perform communications in real time. More specifically, the controller 11 controls the RF unit 15 to engage in communications with another party.

The controller 11 determines whether information is inputted through the key input unit 12 in step S52. That is, the controller 11 determines whether information is inputted by an alphanumeric key of the key input unit 12.

If information is not inputted, the process returns to step S51 in which the mobile the communication terminal 10 is in an active communications state.

If information is inputted, the controller 11 controls the display unit 14 to display the inputted information on a screen of the display unit 14 in step S53. In this case, a processing function for the inputted information is also displayed on the screen of the display unit 14. When an alphanumeric key is selected, the controller 11 generates an input field 21 on the screen. An example of a screen displaying the input field 21 is shown FIG. 4A. The controller 11 controls display unit 14 to display the inputted information 29 in the input field 21. The processing function is displayed as an icon 25 mapped to a key of the key input unit 12. While only one processing function is illustrated, additional processing functions may be displayed or may be selectable. In the example, the inputted information 29 is "01011112222." On the screen of the display unit 14, a character input mode item 22, a menu item 23, and a storage item 24 are mapped to corresponding keys and displayed. A "numeral" displayed in the character input mode item 22 displays that a character input mode of the input field 21 is a numeral. When the storage item 24 is selected, the controller 11 stores the inputted information 29 in a memo pad.

The inputted information 29 may include numerals, Korean characters, English characters, and special characters. Conversion of an input mode is performed by allocating a specific key, other than the alphanumeric key, and a key matched to a selectable processing function, to a toggle key.

The controller 11 determines whether a key for processing the inputted information 29 is selected by the user in step S54. If a key for processing the inputted information 29 is selected, the inputted information 29 is processed in step S55. That is, if the processing function is selected by a user through key input to process the inputted information 29, the controller 11 parses and processes the inputted information 29 according to the selected processing function.

If a key for processing the inputted information 29 is not input at step S54, the controller 11 determines whether communication is terminated in step S56. If communication is not terminated, the process returns to step S52, and the controller 11 determines whether further information is inputted through the key input unit 12.

If communication is terminated, the controller 11 performs an operation of processing the inputted information according to a type of the communication termination. That is, if the communication is terminated compulsorily, the controller 11 processes the inputted information 29 according one process in step S57. If the communication is terminated by entering a communication screen, the controller 11 processes the inputted information according to another process in step S58.

Figure 3:
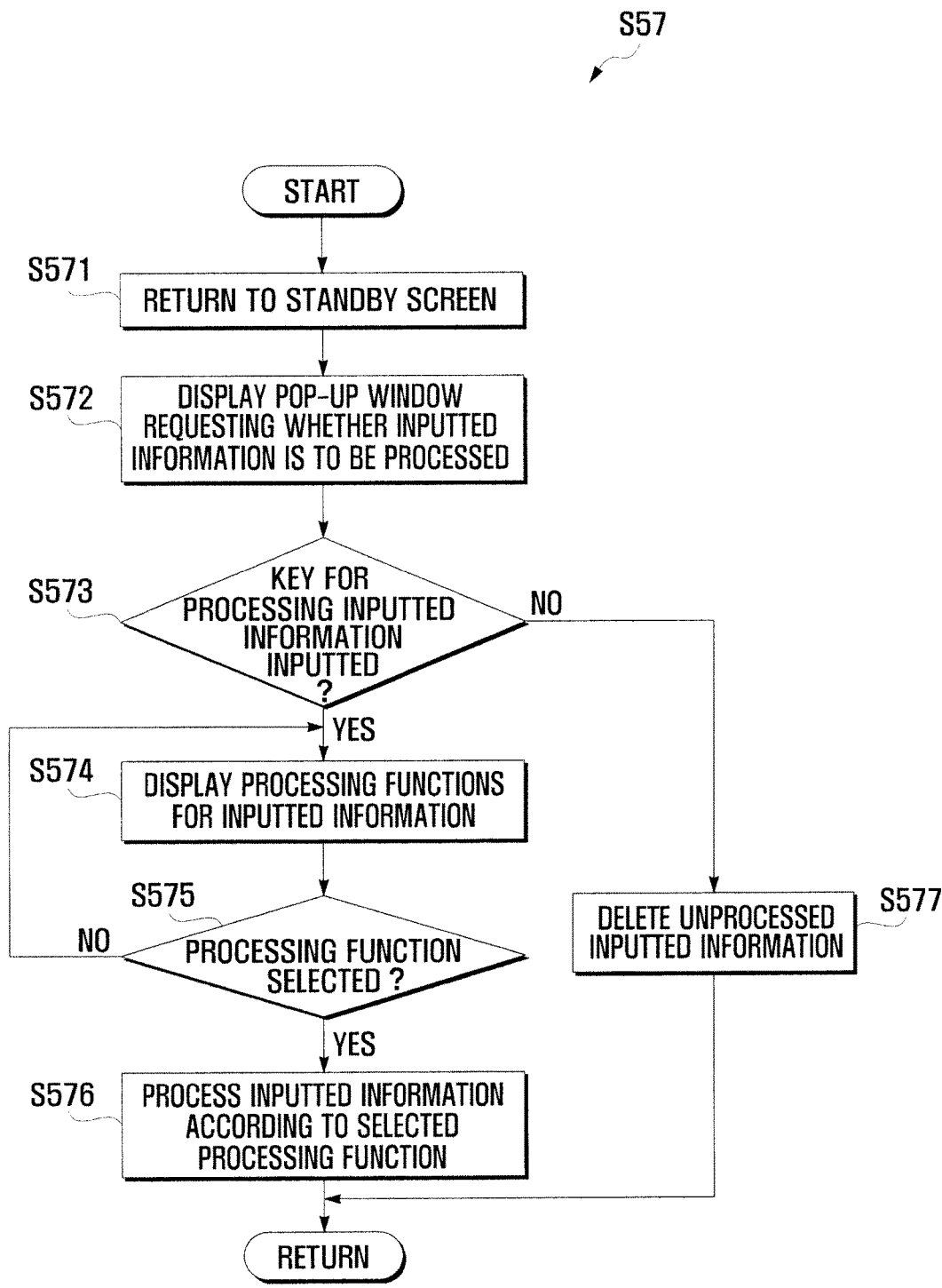
FIG. 3 is a flowchart illustrating a process of processing information inputted when an active communication state is compulsorily terminated in a method, for example, the method in step S57 of FIG. 2 according to an exemplary embodiment of the present invention.

FIG. 3 is a flowchart illustrating a process of processing information inputted when an active communications state is compulsorily terminated in a method, for example, the method in step S57 of FIG. 2 according to an exemplary embodiment of the present invention. FIGS. 4A through 4D illustrate an example of a screen according to a process of processing inputted information, for example, the process of FIG. 3 according to an exemplary embodiment of the present invention.

Referring to FIGS. 1 to 4D, the operation of processing the inputted information 29 in response to a compulsory termination is described.

In a state where unprocessed inputted information exists as shown in FIG. 4A, when an active communications state is compulsorily terminated, the screen of the mobile communication terminal returns to a standby screen in step S571, as shown in FIG. 4B, and the controller 11 controls display unit 14 to display a pop-up window 26 on the screen requesting whether the inputted information is to be processed in step S572, as shown in FIG. 4C. For example, the controller 11 controls display unit 14 to display a pop-up window 26 having sentences "Information is input while performing communication. May I store?" on the screen. The user can recognize that unprocessed inputted information exists through the pop-up window 26.

The controller 11 determines whether a key for processing the inputted information is selected by the user in step S573. If a key for processing the inputted information is selected, the controller 11 controls to display unit 14 to display the selectable processing functions 27 for the inputted information in step S574, as shown in FIG. 4D. The selectable processing functions 27 can be displayed in a list format for selection by key input of the user. For example, "storage of a memo," "storage of a phone number," and "transmission of a message" can be displayed as the selectable processing functions 27.

The controller 11 determines whether one of the selectable processing functions 27 is selected by a key input of the user in step S575. If one of the selectable processing functions 27 is selected by a key input of the user, the controller 11 processes the inputted information according to the selected processing function 27 in step S576. If no processing function 27 is selected, the process returns to step S574 to await selection.

If a key for processing the inputted information is not input in step S573, the controller 11 deletes the unprocessed inputted information in step S577.

Figure 5:
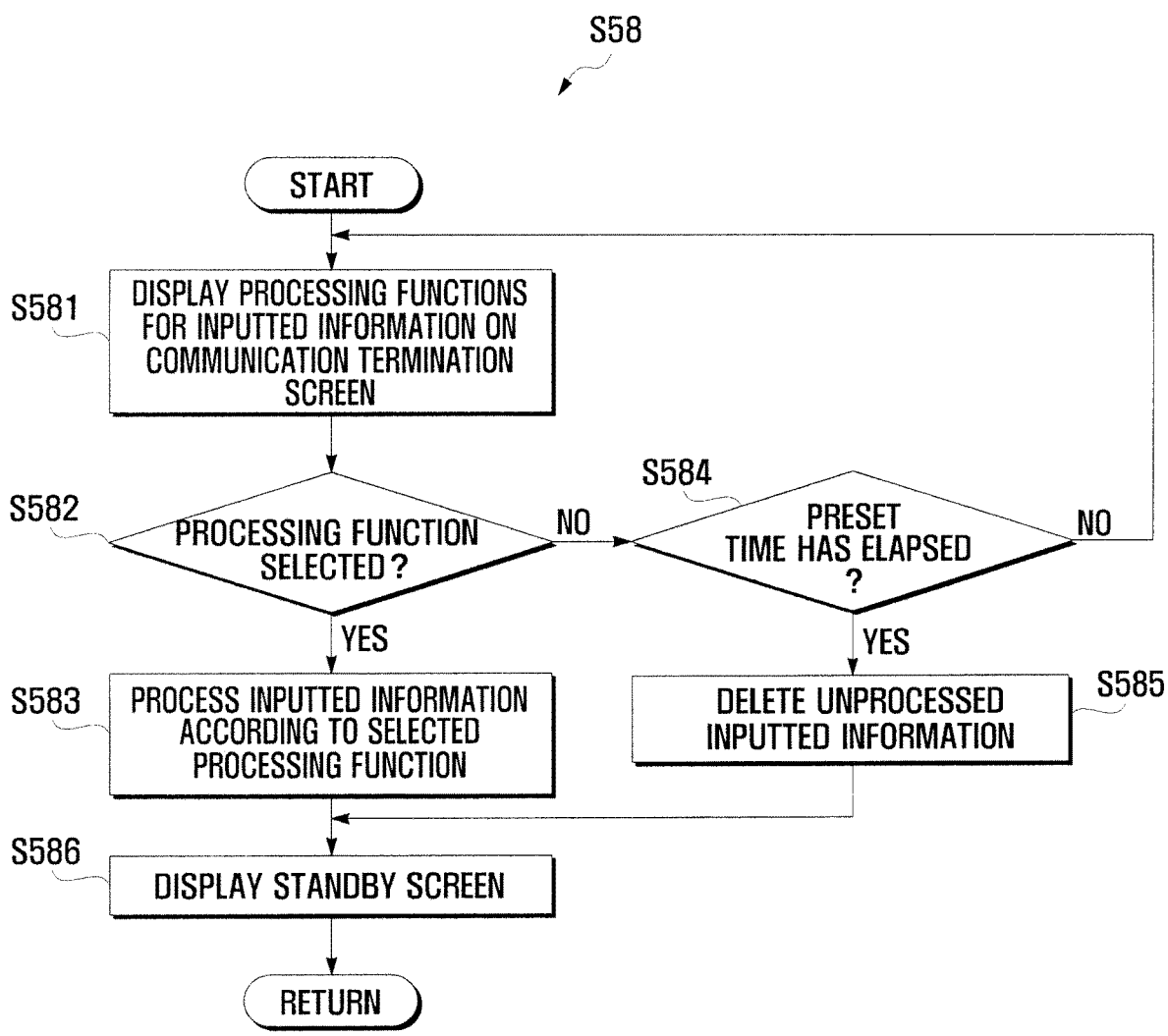
FIG. 5 is a flowchart illustrating a process of processing inputted information when entering a communication termination screen in a method, for example, the method of FIG. 2 according to an exemplary embodiment of the present invention.

FIG. 5 is a flowchart illustrating the operation of processing information inputted when entering a communication termination screen in a method, for example, the method in step S58 of FIG. 2 according to an exemplary embodiment of the present invention. FIGS. 6A through 6C illustrate an example of a screen according to a process of processing inputted information, for example, the process of FIG. 5 according to an exemplary embodiment of the present invention.

Referring to FIGS. 1, 2, 5 and 6A through 6C, the process of processing information inputted when entering a communication termination screen is described.

In a state where unprocessed inputted information exists, as shown in FIG. 6A, when entering a communication termination screen, the controller 11 controls display unit 14 to display selectable processing functions 31, 32 and 33 for the inputted information 29 in a communication termination screen in step S581, as shown in FIG. 6B. The controller 11 also controls display unit 14 to display the inputted information 29.

For example, if the inputted information 29 is a phone number, the controller 11 provides a key guide of a key mapped to memo storage function, communication processing function, and phone number storage function as the selectable processing functions 31, 32 and 33, respectively. The controller 11 also controls display unit 14 to display a phone number, which is the inputted information 29 on the screen. In this case, a memo storage function is mapped to a key for selecting the memo storage processing function 31, a communication function is mapped to a key for selecting the communication processing function 32, and a phone number storage function is mapped to a navigation key for selecting a phone number storage item 33.

The controller 11 determines whether one of the selectable processing functions 31, 32 and 33 is selected in step S582. If one of the selectable processing functions 31, 32 and 33 is selected, the controller 11 processes the inputted information 29 according to the selected processing function in step S583. When processing of the inputted information 29 is completed, the controller 11 converts the communication termination screen to a standby screen in step S586, as shown in FIG. 6C.

If one of the selectable processing functions 31, 32 and 33 is not selected in step S582, the controller 11 determines whether a time duration for selecting one of the selectable processing functions 31, 32, and 33 exceeds a preset time duration in step S584. If a time duration for selecting one of the selectable processing functions 31, 32 and 33 does not exceed a preset time duration, the process returns to step S581 to await selection. If a time duration for selecting one of the selectable processing functions 31, 32 and 33 exceeds a preset time duration, the controller 11 deletes the unprocessed inputted information 29 in step S585 and converts the communication termination screen to a standby screen in step S586. The preset time duration is set to a time duration that enables a user to check the unprocessed inputted information and to select a selectable processing function. For example, the preset time may be set to 10 to 60 seconds.

Figure 7A:
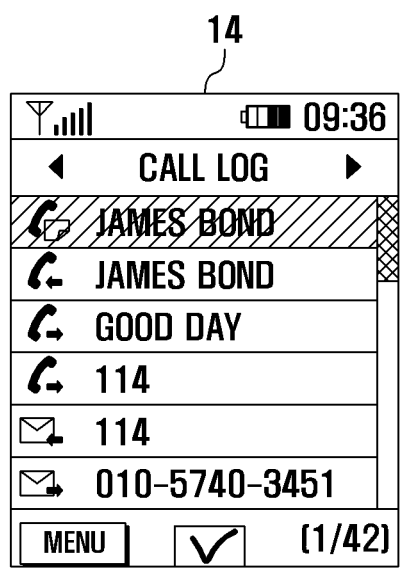
FIGS. 7A and 7B illustrate an example of a screen for checking stored inputted information through a call log according to a method, for example, the method of FIG. 2 according to an exemplary embodiment of the present invention.
Figure 7B:
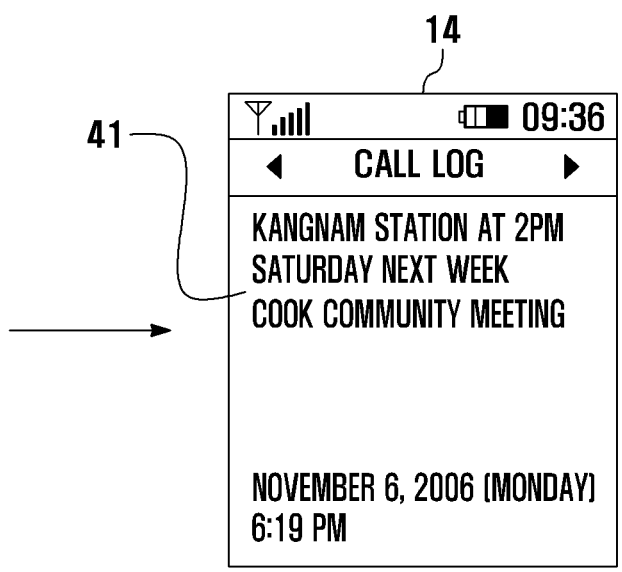

FIGS. 7A and 7B illustrate an example of a screen for checking stored inputted information through a call log according to method, for example, the method of FIG. 2 according to an exemplary embodiment of the present invention. If the user selects a communications log menu of a phone book through key input, the controller 11 controls to sequentially display information of other parties with whom communication has recently been performed on a screen in the form of a call log, as shown in FIG. 7A. If a stored memo is associated with a communication identified in the call log, the controller 11 controls to display unit 14 to display an icon for notifying that a stored memo exists, together with the information of other parties with whom a communication has been performed.

If information of a person having a stored memo 41 is selected by key input of the user, the controller 11 controls display unit 14 to display the stored memo 41 on a screen, as shown in FIG. 7B.

As described above, according to the present invention, while a mobile communication terminal is in an active communications state, information can be input using various input modes such as a numeral, Korean character, English character, and special character input modes.

Even if communication is terminated before the inputted information is processed, a user is notified that unprocessed inputted information exists. Thereby, the user can easily direct the mobile communication terminal on how to process the unprocessed inputted information. That is, if communication is compulsorily terminated, when a screen of the mobile communication terminal returns to a standby screen, a pop-up window is displayed on the screen notifying a user that unprocessed inputted information exists. If communication is terminated using a communication termination screen, the communication termination screen is sustained for a preset time duration so that the user can be made aware of the unprocessed inputted information and then select a processing function. Therefore, even if communication is terminated before the inputted information is processed, loss of the information inputted while the mobile communication terminal is in an active communications state can be prevented.

Further, the inputted information can be processed according to a selectable processing function selected by the user while communication is being performed or after communication is terminated. That is, the inputted information can be divided into a numeral string and a character string and be processed by an application program in the mobile communication terminal according to a selectable processing function selected by the user.

Certain aspects of the present invention can also be embodied as computer readable code on a computer readable recording medium. A computer readable recording medium is any data storage device that can store data which can be thereafter read by a computer system. Examples of the computer readable recording medium include a Read-Only Memory (ROM), a Random-Access Memory (RAM), Compact Disc-ROMs (CD-ROMs), magnetic tapes, floppy disks, optical data storage devices, and carrier waves, such as data transmission through the Internet. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of storing information in a mobile terminal, the method comprising:
   displaying, by the mobile terminal, an execution screen of a call application for indicating a status of a call connection;
   receiving, by the mobile terminal, numeric digits input while the call connection is maintained;
   displaying, by the mobile terminal, the inputted numeric digits in the execution screen of the call application while the call connection is maintained; and
   based on the call connection being terminated, transitioning from the displaying, by the mobile terminal, of the inputted numeric digits in the execution screen of the call application while the call connection is maintained to displaying, by the mobile terminal, of the inputted numeric digits in a changed format from a format of the inputted numeric digits displayed in the execution screen of the call application while the call connection is maintained, the inputted numeric digits in the changed format including non-numeric data added at one or more locations within the inputted numeric digits,
   wherein the inputted numeric digits in the changed format are automatically displayed upon the call connection being terminated.

2. The method of claim 1,
   wherein a user interface item is displayed together while the inputted numeric digits are displayed via a termination screen, and
   wherein the user interface item is, in response to a selection thereof, for initiating another call connection based on the inputted numeric digits.

3. The method of claim 1, wherein the numeric digits are input to the mobile terminal by a user of the mobile terminal.

4. The method of claim 1, wherein the execution screen of the call application includes a user interface item, which in response to a selection thereof, causes a user interface for inputting the numeric digits to be displayed in the execution screen of the call application.

5. The method of claim 1, further comprising:
determining whether the inputted numeric digits correspond to a telephone number format.

6. The method of claim 5, wherein the inputted numeric digits are displayed in the changed format based on a result of the determination.

7. The method of claim 1, wherein the non-numeric data added at one or more locations within the inputted numeric digits comprises a hyphen.

8. The method of claim 1, wherein the inputted numeric digits are stored in a phonebook of the mobile terminal as contact information.

9. A mobile terminal comprising:
a touch screen display;
a transceiver;
a memory; and
at least one processor configured to control to cause the mobile terminal to:
display an execution screen of a call application for indicating a status of a call connection,
receive numeric digits input while the call connection is maintained,
display the inputted numeric digits in the execution screen of the call application while the call connection is maintained,
determine whether the inputted numeric digits correspond to a telephone number format, and
based on the call connection being terminated, transition from the display of the inputted numeric digits in the execution screen of the call application while the call connection is maintained to display of the inputted numeric digits in a changed format from a format of the inputted numeric digits displayed in the execution screen of the call application while the call connection is maintained, the inputted numeric digits in the changed format including non-numeric data added at one or more locations within the inputted numeric digits if the inputted numeric digits correspond to the telephone number format,
wherein the inputted numeric digits in the changed format are automatically displayed upon the call connection being terminated.

10. The mobile terminal of claim 9, wherein the numeric digits are input to the mobile terminal by a user of the mobile terminal.

11. The mobile terminal of claim 9, wherein the execution screen of the call application includes a user interface item, which in response to a selection thereof, causes a user interface for inputting the numeric digits to be displayed in the execution screen of the call application.

12. The mobile terminal of claim 9, wherein the inputted numeric digits are displayed in the changed format based on a result of the determination.

13. The mobile terminal of claim 9, wherein the non-numeric data added at one or more locations within the inputted numeric digits comprises a hyphen.

14. The mobile terminal of claim 9, wherein the inputted numeric digits are stored in a phonebook of the mobile terminal as contact information.

15. A non-transitory computer-readable storage medium configured to store one or more computer instructions, which when executed by at least one processor of a mobile terminal, causes the at least one processor to control to:
display an execution screen of a call application for indicating a status of a call connection;
receive numeric digits input while the call connection is maintained;
display the inputted numeric digits in the execution screen of the call application while the call connection is maintained; and
based on the call connection being terminated, transition from the display of the inputted numeric digits in the execution screen of the call application while the call connection is maintained to display of the inputted numeric digits in a changed format from a format of the inputted numeric digits displayed in the execution screen of the call application while the call connection is maintained, the inputted numeric digits in the changed format including non-numeric data added at one or more locations within the inputted numeric digits,
wherein the inputted numeric digits in the changed format are automatically displayed upon the call connection being terminated.

* * * * *